April 1, 1947.  C. E. WILLIAMS ET AL  2,418,148
METHOD OF PRODUCING CRYSTALLINE IRON BY THE
HYDROGEN REDUCTION OF FERROUS CHLORIDE
Filed Oct. 26, 1943  2 Sheets-Sheet 1

INVENTORS.
Clyde E. Williams
BY Ash ... nd S. Henderson

Darby & Darby
Att'ys

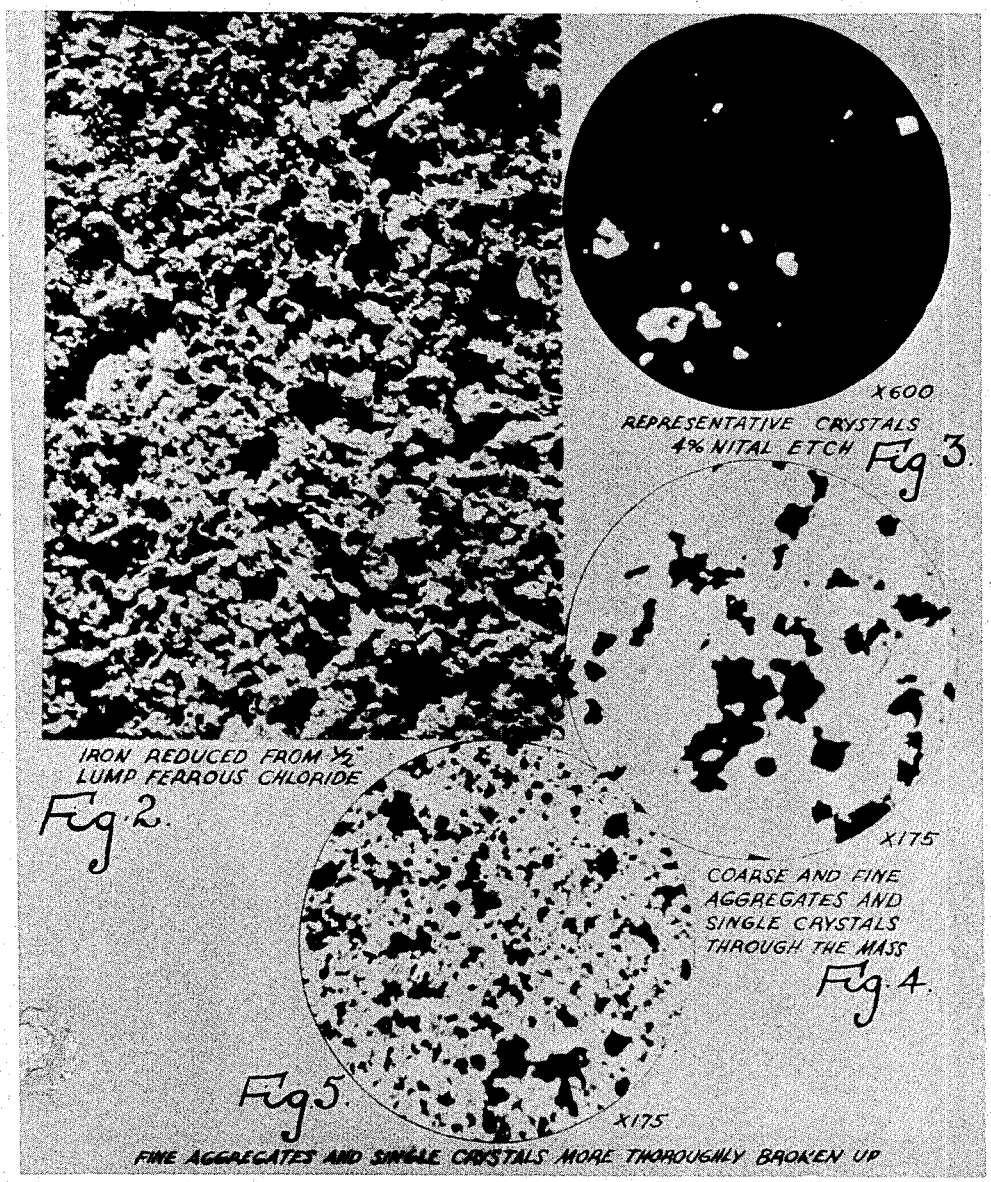

Patented Apr. 1, 1947

2,418,148

UNITED STATES PATENT OFFICE 2,418,148

METHOD OF PRODUCING CRYSTALLINE IRON BY THE HYDROGEN REDUCTION OF FERROUS CHLORIDE

Clyde E. Williams and Ashland S. Henderson, Columbus, Ohio, assignors, by mesne assignments, to Henry L. Crowley & Company, Inc., a corporation of New Jersey Application October 26, 1943, Serial No. 507,668

5 Claims. (Cl. 75—34)

This invention relates to the hydrogen reduction of ferrous chloride, as well as to the product produced thereby. It relates more specifically to the production of an iron aggregate consisting of discrete crystals of high purity iron imperfectly bonded together so as to afford macroscopic porosity. It is possible, by simple attrition methods, to break down this aggregate and to separate the individual particles, one from the other. Iron powder produced by this invention consists of dense, cubic crystals of iron, present as single crystals or small groups of crystals, having a light grey color and metallic luster and whose particle size can be controlled as hereinafter disclosed.

The hydrogen reduction of ferrous chloride, at temperatures above the melting point of the chloride, was suggested many years ago by Peligot (Compt. Rendus Academy of Science, Paris, vol. 18, pp. 670–671, 1844), and more recently has been investigated theoretically by Bagdarsarin (Transactions of American Electrochemical Society, vol. 51, p. 449, 1927). Apparently none of the previous investigators studied or were concerned with the possibility of preserving or controlling these desirable characteristics, or recognized that, by so doing, highly improved commercial results would flow therefrom.

Under the conditions of Bagdarsarin's tests, conducted at temperatures within the liquidus range of the ferrous chloride, large, massive crystals of iron are formed in a relatively static gas system, or wire-like filaments of iron are produced under the conditions of positive gas flow. However neither the large, massive crystals nor the wire-like filaments are suitable for producing powdered iron having the physical characteristics peculiar to the powdered product produced in accordance with our invention. We have discovered that under the proper conditions ferrous chloride may be reduced at temperatures below its melting point to the form of relatively small, discrete crystals of iron, substantially free from unreduced chloride, and with properties specially suited for use in the field of powder metallurgy.

The primary object of our invention, therefore, is to produce a powdered iron having superior characteristics for use in metallurgy.

A further object is to provide a method for producing powdered iron whereby the particle size of the reduced iron may be controlled.

Another object of our invention is to provide a method of producing non-pyrophoric iron powder in a low temperature reduction process.

A further object is to provide a process for producing iron powder from an iron aggregate by gaseous reduction in which the bed of iron aggregate remains pervious to the gas flow throughout the entire reduction process.

Still another object of our invention is to provide an iron powder of exceptional purity and superior magnetic properties.

Another object is to provide a method for producing iron which is capable of reproducible commercial control to yield a uniform product.

Other and further objects will be apparent from the following disclosure and the appended claims.

The invention consists substantially in the process to be described, as well as in the novel product produced thereby, all as will be more fully hereinafter set forth and pointed out in the appended claims.

In order schematically to illustrate the process of our invention, and to enable a clear understanding of the novel, physical characteristics of the product produced thereby, as well as the scientific fundamentals involved, reference is had to the accompanying drawings, wherein—

Figure 1 is a schematic diagram of one system (in this instance a batch system) for obtaining the heterogeneous reduction of ferrous chloride ($FeCl_2$);

Figure 2 is a photographic reproduction of the reduced aggregate product, actual size, produced in accordance with our invention prior to its breakdown or attrition;

Figure 3 is a reproduction of a photomicrograph, using reflected light, of representative individual crystals of iron, which were etched with nitric acid, obtained in accordance with our invention;

Figure 4 is a reproduction of a photomicrograph showing an incomplete breakdown of the reduced aggregate product of our invention in situ;

Figure 5 is a similar illustration with the aggregate more thoroughly broken down; and Figure 6 is a curve illustrating the concentration of hydrogen chloride which can be obtained in hydrogen at various temperatures in the reduction of ferrous chloride.

We have discovered that non-pyrophoric powdered iron having the new and desired characteristics hereinbefore set forth may be produced by reducing ferrous chloride with hydrogen at a temperature above approximately 450° C., and below the melting point of the ferrous chloride.

In accordance with our invention we subject ferrous chloride to a reduction temperature of from between 450° C. and the melting temperature thereof (and preferably between 550° C. and 650° C.) while maintaining a continuous flow of hydrogen gas therethrough. The ferrous chloride is thereby reduced to an aggregate of pure, discrete, cubic iron crystals of substantially uniform size, which aggregate may be broken down by simple attrition methods and used for any of the purposes known to powder metallurgy, as well as for many purposes for which powdered iron heretofore has not been used because of excessive cost or lack of the physical properties thereof now present in the iron produced in accordance with our invention.

A more detailed consideration of the process of our invention may be had by reference to the schematic layout illustrated in Figure 1 which we present as illustrating the fundamental principles involved. In the arrangement therein illustrated there is provided a furnace 2 which, in the form illustrated, is tubular and is provided at its upper end with a removable gastight cover 15. When the cover is removed a basket 1, in which is placed the ferrous chloride, may be lowered into the furnace.

The central portion of the furnace constitutes its heating zone and heat is imparted thereto, for example by means of the electric furnace 12, preferably provided with a silocel packed jacket, as well as with a thermocouple 9, the terminals of which, together with the line from the electric heater, are led to a controller (not shown) whereby the heat given the furnace may be controlled. Both above (at 13) as well as below (at 14) the heating zone formed by the electric heater the furnace is relatively cooler and, if desired, the upper cooler portion 13 of the furnace 2 may be further cooled by a cooling coil 13a, as shown. The upper cover 15 of the furnace 2 is provided with an inlet port communicating with a gas line 16, which line is furnished hydrogen from a tank 3. The hydrogen flows therefrom through a blowout trap 4 which prevents a build up of excessive pressure in the system. A conventional manometer 5 is likewise included in the line 16 by means of which the hydrogen flow conveniently may be measured. The hydrogen is also passed through a heated tube 7, preferably of silica, and heated by a small electric coil 6, to heat the hydrogen to from 600 to 800° C. This tube 7 is filled with copper foil so that any free oxygen present in the hydrogen is catalytically burned to water. Thus it is oxygen-free hydrogen that is passed to the furnace 2.

The bottom of the furnace 2 is likewise provided with a removable gastight cover 17 in which is located a gas trap 8 which will prevent a reverse flow of the gas. A thermocouple 10, if desired, may be suspended from the removable cover 15 at the top of the furnace to check the temperature of the ferrous chloride during the heating cycle.

The operation of the system is as follows:

After the basket 1 containing the ferrous chloride is in place, and the covers 15 and 17 tightly sealed, air is first fully purged from the gas system and the furnace. Then the heated zone of the furnace 2 is brought by the electric heater 12 slowly up to the reduction temperature, viz: between 450° C. and the melting temperature of the ferrous chloride. After the heated zone of the furnace has reached the operating temperature the hydrogen flow is increased to the rate at which the desired concentration of hydrogen chloride is obtained in the exit gas from trap 8. The desired hydrogen chloride concentration depends upon the particle size of the reduced iron desired, as will be hereinafter explained. This rate, once determined, is maintained until hydrogen chloride is no longer present in the exit gas from the trap 8. At this point the ferrous chloride basket 1 is raised into the relatively cooler zone 13 of the reduction furnace and allowed to cool rapidly (utilizing the cooling coil 13a if necessary) through the temperature range where the iron reacts with any water vapor that may be in the hydrogen gas; thereby excessive oxidation is prevented. If desired, of course, a drier (not shown) may be placed in the hydrogen gas line to remove the water vapor from the hydrogen, thereby allowing the iron to be cooled slowly without material danger of oxidation.

The ferrous chloride in the basket has now been reduced to its aggregate form illustrated in Figure 2; and, after removal from the furnace and basket, by simple attrition the aggregate form may be broken down as far as desired or economically feasible, such for example as illustrated in Figures 3, 4 and 5. The iron aggregate should be cooled to room temperature before removal from the furnace, which removal of course should not be effected until after taking precautions to prevent explosion. For example the hydrogen in the furnace may be replaced by nitrogen gas, preferably dried, prior to the opening of the furnace.

Since iron thus reduced from ferrous chloride at a temperature as low as 450° C. shows no signs of pyrophoric properties, it is evident that the use of the chloride for producing iron by a low temperature reduction is both a novel and unexpected solution of the pyrophoric problem. The explanation for this may rest upon the nature of the crystallite formed as contrasted with the crystals formed by the reduction of oxidic material as known in the art.

By actual vacuum fusion analysis an iron powder produced by the present invention at a temperature of 610° C., possessed only 0.25% oxygen after contact with dry air for three months.

Moreover the aggregate as removed from the reduction furnace is light grey in color and has a metallic luster. The color does not change appreciably after the aggregate is broken into a powder. When the chloride content of the iron powder has been reduced, for example to a value of the order of 0.05%, the powder does not change in surface characteristics on continued contact with dry air but shows signs of rusting, as does ordinary iron, in continual contact with moist air. As is readily apparent, this metallic surface is particularly adaptable to the pressing and sintering processes of powder metallurgy fabrication and produces a far superior product. Moreover, the iron produced from the chloride under the hereinbefore disclosed conditions of reduction, is much more metallic in appearance and properties than conventional powdered iron produced by previously known methods.

The ferrous chloride in the basket is relatively impervious to gas flow at the start of the reduction operation. However, as the reduction proceeds the particles of ferrous chloride loosely grow together and the mass becomes permeable to the flow of hydrogen. Contrary to the conventional reduction processes, therefore, the present invention produces a more porous bed as the reduction proceeds. Such a condition allows a better control of gas flow at the conclusion of the reduction and, consequently, simplifies the complete operation.

Figure 2 is a photographic reproduction, actual size, of the iron aggregate produced in accordance with our invention before being broken into powder. From this illustration the porous nature of the aggregate is quite apparent. Of special importance is the point that the ferrous chloride bed shrinks only a small amount, approximately one-fifth, during the reduction, and the iron aggregate produced has a density of less than 1.

As contrasted with the conventional processes, the size of the ferrous chloride fed into the reducing furnace does not influence the size of the iron powder produced. We have produced iron powder having an analysis of 100% passage through a No. 325 mesh screen from ferrous chloride lumps ½" in diameter. Therefore, no preliminary sizing of the ferrous chloride is necessary. However, if desired in actual commercial practice, the ferrous chloride may be sized in such a manner that the gas flow through the bed is not unnecessarily hindered at the start of the operation.

By means of the present invention it is possible to obtain an iron powder of exceptional purity. Using technical grade ferrous chloride we have obtained iron powder which analyzed over 99.5% iron and has as chief impurities only 0.07% C, 0.014% S, and 0.25% Mn. When using high purity ferrous chloride which is easy to obtain by any of the well known methods, an iron powder of approximately spectroscopic purity may be produced. As is well known, the heretofore available iron powder processes do not produce the high purity iron needed in many metal applications for which the iron powder produced in accordance with our invention may now be used.

Because of the purity and crystalline nature of the iron powder produced by our invention, the magnetic characteristics are extremely good. A comparison of apparent permeability between the magnetic properties of the iron powder produced by means of the present invention and the iron powder produced by previous methods is as follows:

Ferrous chloride iron (commercial
  grade) _____ Over +20
Carbonyl iron_____ 0
Electrolytic iron_____ −2 to +6
Hydrogen reduced iron (A grade) _____ −2 to +6
Swedish iron_____ −12 to −4

It will be apparent that the superior magnetic properties obtainable with powdered iron produced in accordance with our invention are of very great value in the adaptation of powdered metal parts to many electrical devices.

Additionally, the process of our invention is adaptable to the production of a uniform product. The particle size of the iron can be controlled by varying one or more of the factors of time, temperature and gas flow during reduction. Since no impurities are added by the reaction a uniform product is obtained. In the past considerable difficulty has been experienced in the various powdered metal processes available because of the inability to produce a uniform powder product. No comparable difficulty is present in the process of our invention.

The hydrogen chloride equilibrium concentration in hydrogen over ferrous chloride is shown in Figure 6 for various temperatures from 400° C. to above the melting point. As can be readily seen, the utilization of the process of the present invention produces less than about 15% of hydrogen chloride in the exit gas stream.

Although a satisfactory iron powder has been produced throughout the temperature range of 450° C. to the melting point, the preferred operating range is between 550° C. to 650° C. In this temperature range sufficient hydrogen chloride gas is present to aid the formation of the desired form of iron and no danger of excessive evaporation or melting of the ferrous chloride is present.

Although ferrous chloride may be reduced to powdered iron at temperatures substantially below 450° C., the reduction rate and the tolerance for water vapor in the hydrogen become much lower. At the higher temperatures, in the liquid phase reduction of ferrous chloride, wire-like crystals tend to be formed. This wire-like crystalline form is not suitable for producing powdered iron having the physical characteristics peculiar to the powder product produced in accordance with our invention, or for many of the end products now for the first time made possible of fabrication by our invention.

Actual tests under operating conditions show gas concentrations that approach the equilibrium values shown in Figure 6 very closely, indicating that relatively high reduction rates are obtained. Because of the marked effect of hydrogen chloride on the growth of metal crystals, the size of the iron particles is primarily influenced by this gas. Therefore it is possible to control the particle size of the iron powder. One way of doing this is to pass sufficient gas through the ferrous chloride to approach the equilibrium concentration of hydrogen chloride in the exit gas and to change this value by raising or lowering the temperature of reduction. Another way is to perform the reduction at a constant temperature and to change the hydrogen chloride content of the exit gas by passing more or less gas through the ferrous chloride, thus operating below the equilibrium concentration of the hydrogen chloride. Either method satisfactorily produces the desired result. We have found that it is possible to obtain substantially uniform iron powders with particle sizes ranging from less than 0.5 micron to more than 40 microns by exercising control over the hydrogen chloride content of the exit gas.

Depending upon the particle size of the iron powder desired, we have found that optimum results are obtained by using a gas flow which produces from 50 to 90% of the equilibrium concentration of hydrogen chloride possible at the particular temperature of operation. However, satisfactory results have been obtained over the range of from 20 to 100% of the equilibrium concentration. In general, however, the volume of hydrogen used per unit reduction obtained at the lower concentration of hydrogen chloride was economically prohibitive and the smaller amount of hydrogen used in obtaining the equilibrium concentration prevented the reduction of sufficient ferrous chloride to be economically feasible.

Figures 3, 4, and 5 show representative photomicrographs of the iron particles produced in accordance with our invention.

Figure 3 shows etched representative crystals photographed by reflected light. Since no grain boundaries are noted, it is apparent that the crystals have been completely separated into individual particles. This powder was mounted in Bakelite, metallographically polished, and etched with nitric acid in alcohol prior to being photographed.

Figure 4 shows an incomplete breakdown of the reduced aggregate in situ, and the aggregate-like nature of the imperfectly bonded crystals. Because of the thickness of the iron particles and clusters, some of the particles appear out of focus when photographed by transmitted light. This effect results from incomplete breakdown of the aggregate.

Figure 5 shows an iron powder which has been broken down sufficiently to be essentially completely disintegrated into individual particles. However the residual aggregate here shown may be further broken down if desired.

Although not too clearly shown in Figures 3 to 5, inclusive, the iron powder as reduced has a very regular cubic particle shape whose size may be controlled by the chemical variables of the reduction process rather than by subsequent mechanical grinding, as in the case of the prior art processes.

As mentioned hereinbefore, a breakdown of the aggregate produced in accordance with our invention is necessary only to disintegrate the imperfect bonds between adjacent cubic particles. Under the breaking down conditions used to produce the samples illustrated in Figures 3 to 5, inclusive, which were far more stringent in character than would ordinarily be employed in commercial practice, many of the cubic crystals, because thereof, are mashed into irregular shape. However the regular cubic structures may be retained throughout by proper control of the breakdown process employed. For this purpose, therefore, attrition breakdown, as distinguished from grinding in the normal sense, is particularly desirable.

The cubic structure of the iron powder produced from ferrous chloride by means of our invention is readily distinguishable from and contrasted with the physical character of the iron powders produced by all other prior art processes. For example, the powder particles produced from the purer or better grades of carbonyl iron are spherical in shape; the powder produced from oxide reduced iron is spongy; and that produced by electrolytic iron is flake-like. As distinguished therefrom, and as before stated, the powdered product produced in accordance with our invention consists of substantially uniform discrete cubic crystals each having substantial density which, from all indications, contribute in some manner to the exceptional utilitarian properties of the products made therefrom.

Another physical characteristic of the end product herein disclosed is concerned with its actual density. Actual tests show that the density of the iron powder produced by the process herein disclosed, as measured in a pycnometer, is above 7.3 grams per cubic centimeter and in many cases approaches the density of metallic iron as compared with conventional densities of less than 6.8 grams per cubic centimeter of iron powder produced by other processes.

The tolerance to water vapor of the ferrous chloride and the reduced iron at the reduction temperature is rather large, consisting of a range up to approximately 10% of the total volume of the hydrogen at the inlet to the furnace. However, as controlled by the chemical equilibrium, the iron will react with water vapor of this and lower concentrations at lower temperatures. Therefore, it is necessary to cool the iron aggregate produced during the reduction in substantially water- and oxygen-free hydrogen, although the reduction may be performed using oxygen-free hydrogen containing less than 10% water vapor. This permits considerable freedom in performing the reduction operation, but careful control must be exercised during the cooling stage to avoid oxidation of the iron by the water vapor present in the hydrogen. We have found that it is possible to overcome this oxidation during the cooling operation by cooling the iron aggregate rapidly through the dangerous range, and therefore the cooling coil (13a, Figure 1) has been provided. However, by the use of specially purified hydrogen, as hereinbefore explained, the oxidation during the cooling operation may be completely eliminated.

It is immaterial from what source the ferrous chloride is obtained. This is an important factor because it makes readily available to the process of our invention vast quantities of scrap-iron, iron oxide, etc., as a source of raw material at exceptionally low cost. These are subjected to the action of hydrochloric acid to produce ferrous chloride tetrahydrate or dihydrate which may be economically and readily dehydrated to produce anhydrous ferrous chloride. When ferrous chloride tetrahydrate is heated to remove the water of hydration, using steam as a protective atmosphere, some iron oxide is formed. By actual chemical analysis over 5% ferric and ferrous oxide was found in anhydrous ferrous chloride produced as above outlined. Of special significance is the fact that the presence of this quantity of oxide in the chloride does not affect the nonpyrophoric or physical nature of the iron aggregate. Although this condition is unexpected, it is readily explained when the chemical reactions are stated.

Inasmuch as it is well known that the iron produced by the hydrogen reduction of the oxide is pyrophoric when reduced in the temperature range used by the present invention, although the ferrous chloride reduced iron is not, it seems probable that the oxide present in the ferrous chloride is transformed into ferrous chloride by the following series of reactions:

$$Fe_2O_3 + H_2 \rightarrow 2FeO + H_2O$$
$$FeO + 2HCl \rightarrow FeCl_2 + H_2O$$

The first of these reactions is well known and we have found that the second reaction is over 80% complete in the temperature range used in accordance with our invention. We have further found that this reaction cannot be repressed by a concentration of water vapor below the 10% tolerance previously mentioned.

When the iron oxide is formed during the dehydration of the ferrous chloride tetrahydrate to ferrous chloride anhydrous, an approximately equal amount of ferric chloride is also formed. However ferric chloride may be readily reduced to ferrous chloride at temperatures well below the sublimation temperature of the ferric chloride. Therefore, by bringing the ferrous chloride containing ferric chloride through the temperature range of from 250° C. to 350° C., using a substantial hydrogen gas flow, the ferric chloride will be completely reduced before the temperature of volatilization occurs. Thus, by actual operation, we have found that ferrous chloride containing 4% ferric chloride has produced the desired iron powder by following the hereinbefore described technique.

We have also found, by actual operations, that anhydrous ferrous chloride is not necessary. Since ferrous chloride tetrahydrate melts in its water of crystallization between 70 and 100° C.

this salt must be partially dehydrated before it can be heated above this temperature without melting. Therefore ferrous chloride containing three molecules of water per molecule of chloride has been placed directly into the batch type reduction furnace hereinbefore disclosed and dehydrated while heating the furnace to the reduction temperature.

The presence of other impurities which would normally occur in ferrous chloride does not appear to influence the reduction reaction.

It is believed that the advantages and benefits of and flowing from the process of our invention will readily be appreciated by those skilled in the art of powder metallurgy. Principal among these may be mentioned the extremely low overall as well as operational cost of the process; the extraordinary high degree of purity of the iron powder produced, its uniformity in crystal size, the density of the crystals, as well as the control of their size in production enabling the fabrication of better end products, as well as the fabrication of many end products from powdered iron heretofore regarded as impractical or not economically feasible.

With respect to the end products that can be made from the powdered iron produced in accordance with our invention, it is believed that it will also be clear to those skilled in the art of powder metallurgy that better products can be made therefrom, because of the novel and remarkable physical characteristics thereof, than heretofore made of powdered iron. For example, gears, cams, and complicated machine parts requiring high ductility can be produced having greater strength and greater ductility. Moreover, the greatly increased degree of purity of the iron will enable it to absorb carbon more readily for any desired hardening process. Similarly, magnetic pole pieces, transformer irons, magnetic armatures for relays, and other magnetic devices may be made from the powder produced in accordance with our invention with higher permeability. In fact, due to the purity, absence of oxide surface, and uniformity of particle size, it may be generally stated that the powdered iron produced in accordance with our invention is greatly more efficacious than any other powdered iron known to us for the fabrication of all products produced by pressure forming. This may be because the individual crystals are more closely and effectively welded together when subjected to high pressure so that greater strength is obtained and, in fact, in some cases, sintering may be dispensed with, or, if not dispensed with, will be more effective. A section of a body produced by high pressure exerted on the powdered iron produced in accordance with our invention gives the appearance of such solidification as to lead one to believe it had been produced from the molten metal.

Among the products never heretofore made from powdered iron, so far as we are aware, because of prohibitive cost or physical deficiencies, but which now may be fabricated from powdered iron possessed of the physical characteristics now obtainable in accordance with our invention, may be mentioned bushings, washers, and similar products now made from rod, bar or cast iron; certain types of permanent magnets, such as speaker magnets; parts subject to impact, shock or strain; and parts such as bearings which must be free from abrasive action due to the presence of silica and still have the advantage of the greater strength and load carrying capacity of iron.

Of course many other products may be named, but the ones above mentioned are believed to be sufficient to be indicative of the fields of product fabrication open to the powdered iron of the characteristics now made commercially available at low cost as a result of our invention.

To summarize and crystallize the process of our invention, one specific form thereof involves the following steps:

1. Partially, or if desired, substantially dehydrated ferrous chloride is obtained from any suitable source, for example from ferrous chloride tetrahydrate; then 2. Placing this ferrous chloride in a furnace which preferably has been purged with oxygen free hydrogen; and 3. Subjecting it to a reduction temperature, between 450° C. and the melting temperature of the ferrous chloride, preferably between 550° C. and 650° C., while 4. Maintaining a continuous flow of hydrogen gas through the ferrous chloride to finish the dehydration thereof and thereby reducing any ferric chloride that may be formed during the dehydration step; then 5. Increasing the hydrogen flow, when reduction temperature is attained, to the operating rate and maintaining it at such rate until the reduction of the ferrous chloride to an iron aggregate is completed; after which 6. Rapidly cooling the iron aggregate produced in an oxygen-free hydrogen atmosphere, or slowly cooling it in an oxygen and water vapor-free hydrogen atmosphere; then 7. Breaking it down by attrition methods to the desired powder.

This, we believe, constitutes a new and novel process for producing iron powder having characteristics unobtainable by any methods heretofore known.

It will be understood that our invention is not intended to be limited to the batch method schematically illustrated as one means for practicing our invention. A review of the foregoing enumerated essential steps of our process will crystallize this inasmuch as it will be clear that the essential steps are adaptable to many other types of processes, as well as many various types of apparatus used in conjunction therewith. For example, it is economically desirable in commercial practice to use a cyclic or continuous countercurrent reduction process; and we have so used such a system and prefer it for commercial purposes to the batch system herein schematically illustrated for ease of explanation. An examination of the essential steps of the process above enumerated clearly shows that they are especially adaptable to a cyclic or continuous countercurrent reduction system. However, inasmuch as the claims herein presented intentionally are not directed to any particular type of process, as distinguished from the reduction process per se, and inasmuch as the specific details of an apparatus for the adaptation of the process of our invention to a cyclic or continuous countercurrent reduction process will form the subject matter of a separate application for patent, it is believed to be neither necessary nor desirable to go further into the details of such a system.

Having now set forth the objects and nature of our invention, and having shown and described the features thereof, what we claim as new and useful and desire to secure by Letters Patent is:

1. The method of producing iron powder whose particles are crystalline and of substantially uniform size and density by the reduction of ferrous chloride, which comprises subjecting the ferrous chloride to the action of hydrogen while maintaining the ferrous chloride during reduction at a temperature below its melting point.

2. The method of producing iron powder whose particles are crystalline and of substantially uniform size and density by the reduction of ferrous chloride, which comprises subjecting the ferrous chloride to the action of hydrogen while maintaining the ferrous chloride during reduction at a temperature between 550° C. and 650° C.

3. The method of producing iron powder whose particles are crystalline and of substantially uniform size and density by the reduction of ferrous chloride, which comprises causing hydrogen to flow therethrough while maintaining the ferrous chloride during reduction at a temperature between 550° C. and 650° C.

4. A method of producing iron powder whose particles are crystalline and of substantially uniform size and density by the reduction of ferrous chloride, which comprises heating the ferrous chloride to a temperature below its melting point by forcing sufficient heated hydrogen therethrough to maintain the ferrous chloride at such temperature and the hydrogen chloride concentration in the hydrogen within the mass from 50 to 90 per cent of the concentration possible at such temperature.

5. A method of producing iron powder whose particles are crystalline and of substantially uniform size and density by the reduction of ferrous chloride, which comprises heating the ferrous chloride to a temperature in the range of 550° C. to 650° C. by forcing sufficient heated hydrogen therethrough to maintain the ferrous chloride at such temperature and the hydrogen chloride concentration in the hydrogen within the mass from 50 to 90 per cent of the concentration possible at such temperature.

CLYDE E. WILLIAMS.
ASHLAND S. HENDERSON.

REFERENCES CITED

The following references are of record in the file of this patent:

UNITED STATES PATENTS

| Number | Name | Date |
|---|---|---|
| 2,142,694 | Maier | Jan. 3, 1939 |

FOREIGN PATENTS

| Number | Country | Date |
|---|---|---|
| 346,921 | British | Apr. 23, 1931 |

OTHER REFERENCES

Chemical Abstracts volume, 33–1939, page 27. (Copy in Div. 6.)

Powder Metallurgy—Wulff, pages 118 to 121.